(12) United States Patent
Epstein et al.

(10) Patent No.: US 11,911,653 B2
(45) Date of Patent: Feb. 27, 2024

(54) OMNIDIRECTIONAL MOVING SURFACE INCLUDING MOTOR DRIVE

(71) Applicant: OmniPad, Inc., Tallahassee, FL (US)

(72) Inventors: Neil Epstein, Tallahassee, FL (US); David Carmein, Mound, MN (US)

(73) Assignee: OmniPad, Inc., Tallahassee, FL (US)

( * ) Notice: Subject to any disclaimer, the term of this patent is extended or adjusted under 35 U.S.C. 154(b) by 188 days.

(21) Appl. No.: 17/282,346

(22) PCT Filed: Oct. 2, 2019

(86) PCT No.: PCT/US2019/054371
§ 371 (c)(1),
(2) Date: Apr. 1, 2021

(87) PCT Pub. No.: WO2020/106369
PCT Pub. Date: May 28, 2020

(65) Prior Publication Data
US 2021/0346755 A1    Nov. 11, 2021

Related U.S. Application Data

(60) Provisional application No. 62/777,944, filed on Dec. 11, 2018, provisional application No. 62/740,008, filed on Oct. 2, 2018.

(51) Int. Cl.
*A63B 22/02* (2006.01)
*F16C 19/20* (2006.01)

(52) U.S. Cl.
CPC .......... *A63B 22/0285* (2013.01); *F16C 19/20* (2013.01); *A63B 2022/0271* (2013.01)

(58) Field of Classification Search
CPC ........ A63B 22/0285; A63B 2022/0271; A63B 22/0235; A63B 2209/08; A63B 2225/09; A63B 22/0023; A63B 2071/0638; A63B 2209/00; A63B 24/0087; A63B 71/0622; A63B 2225/74; F16C 19/20; F16C 23/06;
(Continued)

(56) References Cited

U.S. PATENT DOCUMENTS 5,980,256 A * 11/1999 Carmein ................ G09B 9/165
                                                                    482/902
6,743,154 B2 * 6/2004 Epstein .................... G06F 3/011
                                                                    482/54
(Continued)

FOREIGN PATENT DOCUMENTS

CN          104667488 A      6/2015
CN          109641143 A      4/2019
(Continued)

OTHER PUBLICATIONS

Extended European Search Report issued in EP Patent Application No. 19887094.1, dated Jun. 7, 2022, 6 pages.
(Continued)

*Primary Examiner* — Garrett K Atkinson
(74) *Attorney, Agent, or Firm* — Rimon PC

(57) ABSTRACT

A motor driven omnidirectional treadmill that allows users to walk, jog, or run in any direct ion. When the treadmill is coupled with computer-generated immersive environments users can maneuver their way on-foot through 360-degree VR environments of infinite expanse and scope.

20 Claims, 17 Drawing Sheets

(58) Field of Classification Search
CPC .. F16C 27/045; F16C 27/066; F16C 32/0406; F16C 2316/30; F16C 33/38
See application file for complete search history.

(56) References Cited

U.S. PATENT DOCUMENTS

| | | | | |
|---|---|---|---|---|
| 7,878,284 | B1* | 2/2011 | Shultz | B60C 7/22 |
| | | | | 180/199 |
| 11,173,364 | B2* | 11/2021 | Wang | A63B 69/0035 |
| 11,213,732 | B2* | 1/2022 | Zhao | B25J 11/003 |
| 11,543,880 | B2* | 1/2023 | Wang | G06F 3/011 |
| 2004/0048722 | A1* | 3/2004 | Epstein | G06F 3/011 |
| | | | | 482/54 |
| 2010/0147430 | A1* | 6/2010 | Shultz | B60C 7/18 |
| | | | | 152/450 |
| 2012/0302408 | A1* | 11/2012 | Burger | A63B 22/0242 |
| | | | | 482/54 |
| 2013/0132910 | A1* | 5/2013 | Belmon | G06F 3/04815 |
| | | | | 715/850 |
| 2019/0224521 | A1* | 7/2019 | Olsson | A63B 22/0285 |
| 2019/0255382 | A1* | 8/2019 | Rudelstorfer | A63B 21/15 |
| 2021/0034143 | A1* | 2/2021 | Wang | A63B 22/0285 |

FOREIGN PATENT DOCUMENTS

| | | | |
|---|---|---|---|
| DE | 10 2006 038803 A1 | | 2/2008 |
| DE | 10 2016 207830 A1 | | 11/2017 |
| WO | WO-2018046077 A1 | * | 3/2018 ......... A63B 22/0023 |

OTHER PUBLICATIONS

Office Action issued in CN Patent Application No. 201980079647.9, dated Feb. 8, 2022, 12 pages (with translation).
Second Office Action issued in Chinese Patent Application No. 201980079647.9 dated Sep. 9, 2022, 14 Pages (with translation.).
Response to Second Office Action issued in Chinese Patent Application No. 201980079647.9 dated Sep. 9, 2022, Filed Jan. 18, 2023.
Third Office Action issued in Chinese Patent Application No. 201980079647.9 dated Mar. 13, 2023.
Office Action issued in Japanese Patent Application No. 2021-543978 dated Sep. 5, 2023.

* cited by examiner

Figure 11-A

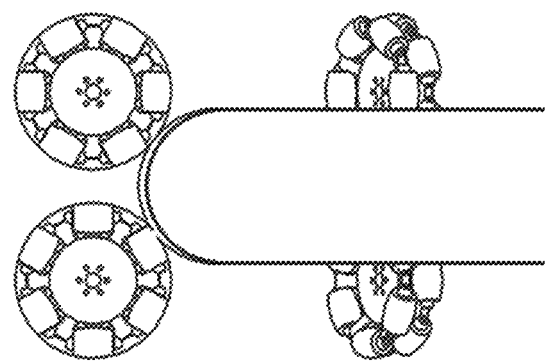
Figure 28
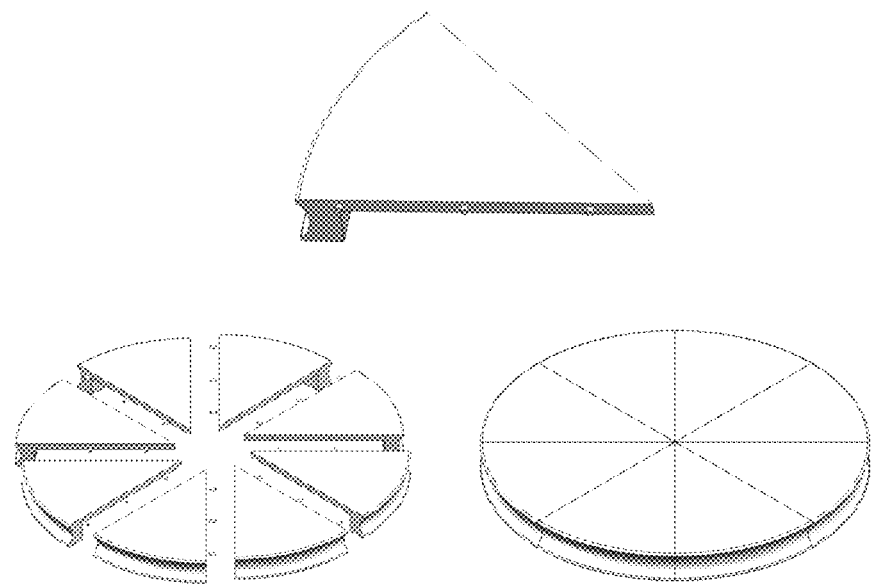
Figure 29
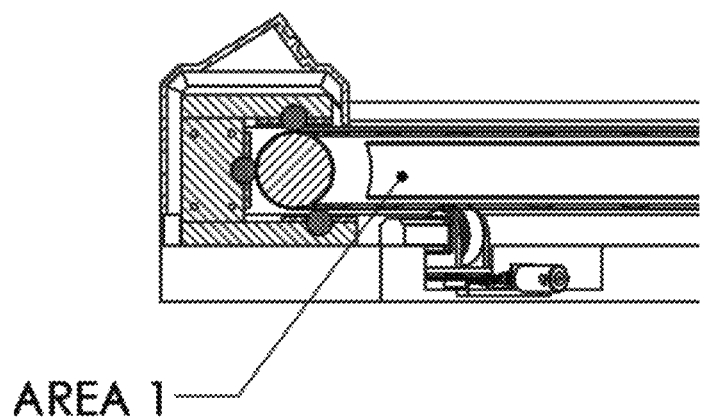
AREA 1

OMNIDIRECTIONAL MOVING SURFACE INCLUDING MOTOR DRIVE

CROSS-REFERENCE TO RELATED APPLICATIONS

This application is a National Phase application of PCT/US2019/054371 filed Oct. 2, 2019, which in turn claims benefit and priority to U.S. provisional patent application 62/740,008 filed Oct. 2, 2018 and 62/777,944 filed Dec. 11, 2018. The disclosures of all of the above patent applications are hereby incorporated herein by reference.

SUMMARY

The OmniPad is an omnidirectional treadmill that allows users to walk, jog, or run in any direction. When the OmniPad is coupled with computer-generated immersive environments users can maneuver their way on-foot through 360-degree VR environments of infinite expanse and scope.

The OmniPad™ is an Omni-Directional locomotion Input device specifically intended for use in virtual reality immersive environments. The OmniPad™ is the primary component of the OmniPad Environment.

The OmniPad is made up of many parts and subassemblies. This document provides a general description of the operation and components of the OmniPad. Each section describes one or more inventions that will form the bases for utility patent applications.

BRIEF DESCRIPTION OF THE DRAWINGS

FIGS. 11A and 11B illustrate single and multi-layered tread surfaces, according to various embodiments of the invention. Various embodiments include a single-skinned revolving tread surface, where the single skin may be comprised of multiple layers suiting the anti-friction requirements of the inner tread, while concurrently suiting the anti-slip requirements of the outer tread where the locomotion takes place. FIG. 11B includes a cut-away close-up of multi-layered single-skinned revolving tread material.

FIG. 23B illustrates the detail and polarity configuration of both the Spindle and the Spindle support system, according to various embodiments of the invention.

FIG. 28 illustrates a segmented inner locomotion platform, according to various embodiments of the invention. A segmented solid inner locomotion platform that expands outwards equally in all directions for the purpose of fitting the inner platform snugly inside of the spherical revolving tread; useful for initial assembly of the device, as well as for periodic adjustments to the fitting of the revolving tread. Sections may expand via a hydraulic system that may be activated by remote control and powered by a wireless charging mechanism.

FIG. 29 illustrates an injection system, according to various embodiments of the invention. Injection of substance into spherical locomotion tread that solidifies and is able to be formed into the locomotion surface.

DETAILED DESCRIPTION

Figure 1A:
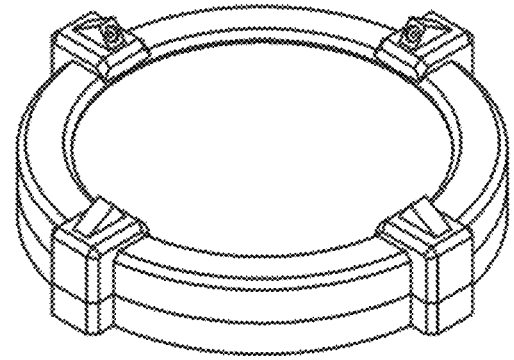
FIG. 1A Illustrates an isometric view of an omnidirectional treadmill, according to various embodiments of the invention.
Figure 1B:
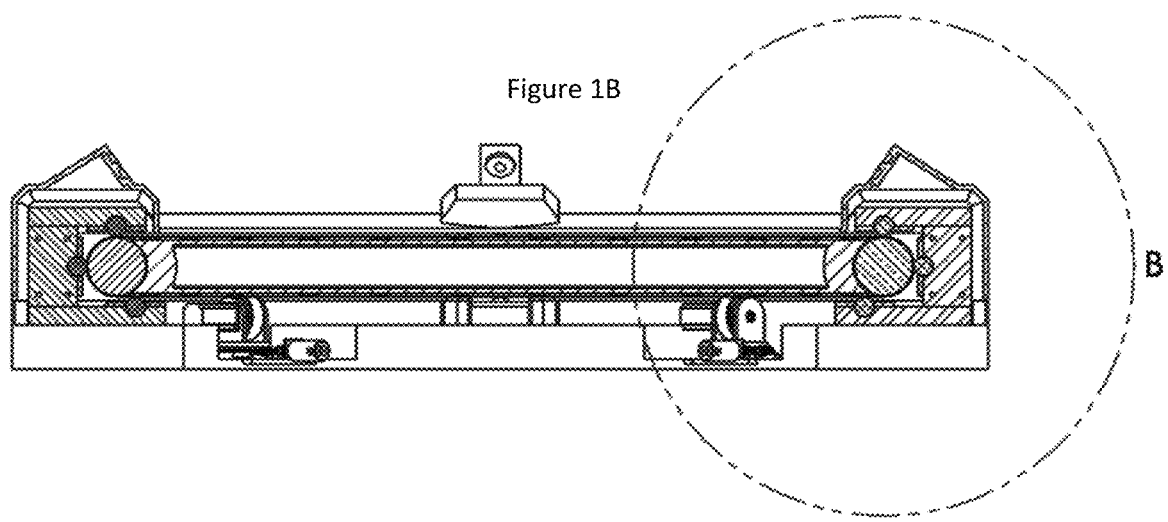
FIG. 1B illustrates a cross-sectional view of the treadmill, according to various embodiments of the invention.
Figure 1C:
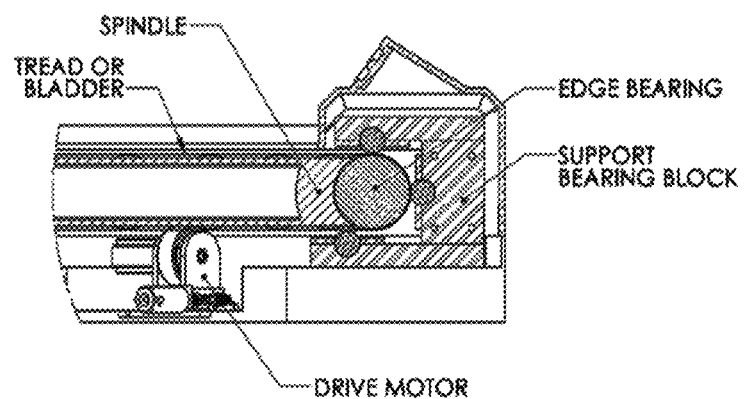
FIG. 1C illustrates a detailed view of the cross-section of FIG. 1B, according to various embodiments of the invention.

Referring to FIGS. 1A and 1B and 1C.

Tread: The tread will be fabricated using highly flexible and extremely durable rubber-like material like Silicone, EPDM or natural rubber which can be motivated by a person walking or running. The tread is manufactured in such a way that it is a single sphere like embodiment, which is then wrapped over the spindle, entirely encasing the spindle and bearings. This material is flexible enough to enable a 360-degree change in direction around the spindle.

Spindle-Walking Platform: The Spindle will be approximately 200 mm thick and approximately 1-2 meters diameter. The Top Surface is designed to support the user during operation.

Edge Bearings: The edge bearings reduce the friction on the tread (bladder) as it rotates around the spindle. The bearings enable the free 360-degree mobility of the bladder.

Figure 2:
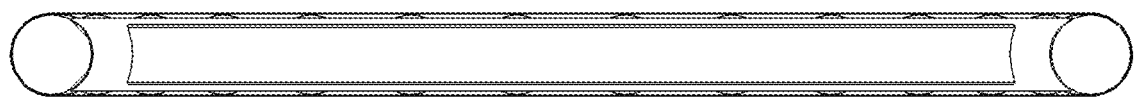
FIG. 2 illustrates a locomotion surface, according to various embodiments of the invention.

Bobbin: Referring to FIG. 2. The bobbin assembly is the combination of the tread (bladder), spindle, edge bearings and lubrication as shown below. The bobbin assembly allows the user to be in the virtual environment and move as if they are in the natural world. This assembly is supported by the support bearing blocks.

Figure 3:
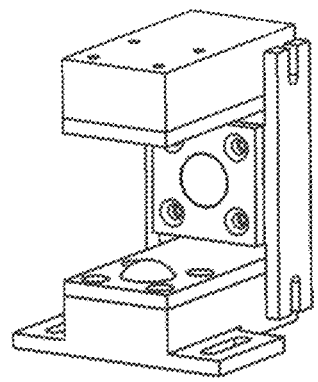
FIG. 3 illustrates a bearing support system, according to various embodiments of the invention.

Support Bearing Block: Referring to FIG. 3. The bearing support system allows the bobbin assembly to move with little or no friction, as shown below. This system supports the bobbin during operation and translates the loads to base system.

Figure 4:
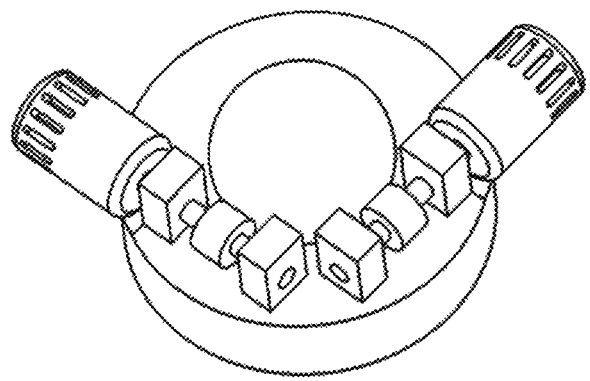
FIG. 4 illustrates a motor drive system, according to various embodiments of the invention. The optional motor drive system being configured to drive and/or assist the revolving tread surface.

Motor Drive System: Referring to FIG. 4. The Motor drive system is used to assist the users' natural locomotion, and to relay the locomotion gestures to the virtual environments, which will update in real time, as shown below.

Tread Materials: The tread will be fabricated using highly flexible and extremely durable rubber-like material like Silicone, EPDM or natural rubber which can be motivated by a person walking or running. The tread is manufactured in such a way that it is a single sphere like embodiment, which is then wrapped over the spindle, entirely encasing the spindle and bearings. This material is flexible enough to enable a 360-degree change in direction around the spindle. The tread will be manufactured in such a way that it is a continuous surface, which is then wrapped over the spindle to entirely encase the spindle and bearings.

Figure 5:
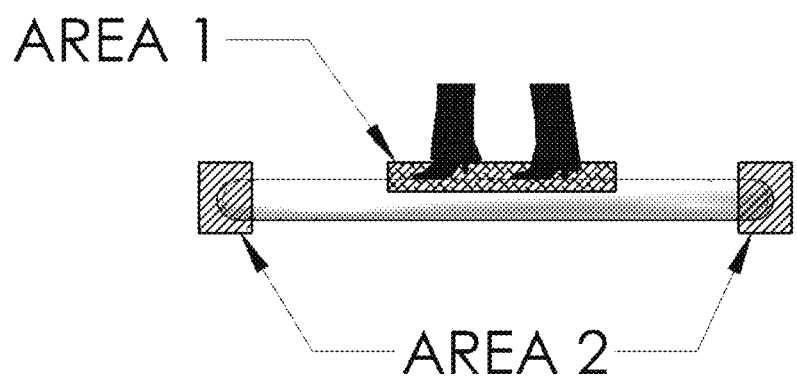
FIG. 5 illustrates a smart tread design according to various embodiments of the invention. Optionally the fabric of the tread surface may be stiffened or loosened in certain areas, in real time, by the use of an electric Polyhedral assembly of the revolving tread surface, rather than implementing a single-skin tread.

Smart Adaptive Tread Material: The Smart Adaptive Tread Material will alter, in real time, the material's properties when a voltage, electrical field, current or magnetic field is applied. When the voltage, current or field is applied to a specific area of the surface just that area's material properties will change. For example, as the current or field is applied to the material the material will become more flexible or stiff in that localized area only. Referring to FIG. 5. Area 1=Walk area, drive area or support area, stiff area to limit slip or buckling in the material Area 2=Flexible area.

Figure 6:
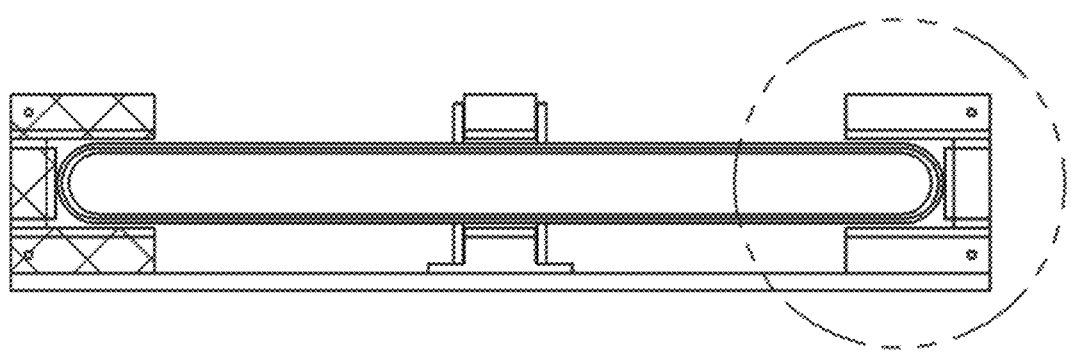
FIG. 6 illustrates a ferrous tread material, according to various embodiments of the invention. The ferrous tread material designed to function as part of the magnetic levitation system, which will levitate the entire Spindle system for enable ease of revolution of the moving tread surface.
Figure 7:
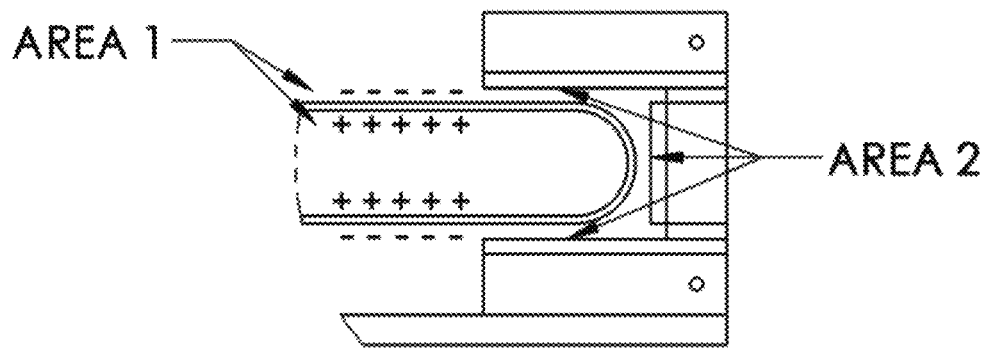
FIG. 7 illustrates polarity of a ferrous tread material, according to various embodiments of the invention. The figure includes an exemplary illustration of the polarity configuration of the Ferrous tread surface within the magnetic levitation system.

Ferrous Tread Material: Bobbin Support Referring to FIGS. 6 and 7. Currently, magnetic bearings are commonly used in industrial applications such as turbomolecular pumps, or even mag-lev trains. The Ferrous tread material allows for the omnidirectional locomotion surface to be magnetically polarized, thereby, attracting or repelling magnetic or electromagnetic forces. This allows the tread to magnetically levitate the bobbin assembly. In FIG. 7 Area 1=Magnetically polarized tread Area 2=Mag-Lev bearing block.

Figure 8:
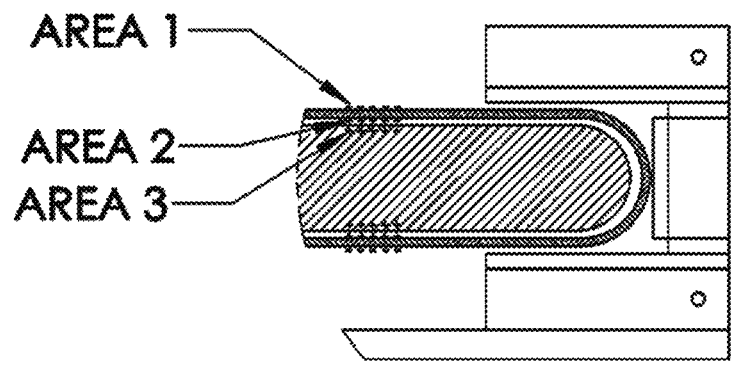
FIG. 8 illustrates an alternative configuration of a ferrous tread material, according to various embodiments of the invention. A secondary application of the Ferrous tread, for magnetically reducing the friction between the elastic tread and the inner locomotion platform; which is also magnetized with the opposite polarity.

Friction Reduction: Referring to FIG. 8, another use for the ferrous tread material is to be suspend away from the spindle, therefore lowering the frictional forces. By using the magnetically repelling forces and the elasticity of the tread itself, the tread will separate from the spindle providing a small gap, thus lowering the friction between the spindle and the tread. In FIG. 8, Area 1=Negatively charged outer surface Area 2=Positively charged inner tread surface; Area 3=Positively charged outer spindle surface.

Figure 9A:
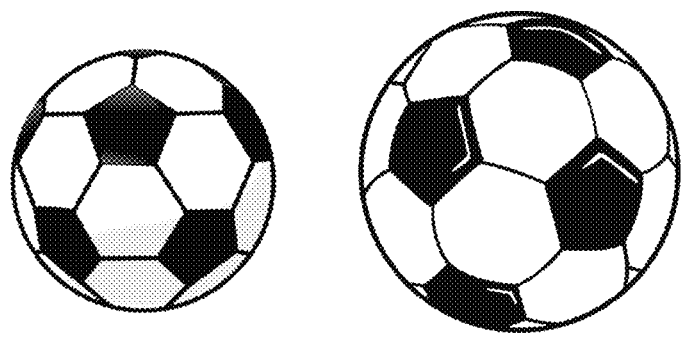
FIGS. 9A and 9B illustrate a polyhedral configuration of a tread surface, according to various embodiments of the invention. Polyhedral assembly of the revolving tread surface, rather than implementing a single-skin tread has advantages. Polyhedral tread assembly is optionally produced with holes in the segments in order to reduce the stress on the individual components, and to allow frictional heat to ventilate from inside of the revolving tread.

Goldberg Polyhedral Tread Material: Referring to FIG. 9A Another embodiment of the bladder is comprised of discrete segments. These segments typically take the shape of either hexagon or pentagon polyhedrons which are edge-connected to form a sphere.

Polygon segments used in any of the Goldberg polyhedral spheres will be made from a flexible material. The individual polyhedral elements need to stretch in any arbitrary direction a minimum of 150% of its original dimension in any planar direction. Categories of materials that possibly fulfill this mission are thermoplastic rubbers, or stretchable fabric like elastane (Spandex).

The Goldberg construction uses hexagons and pentagons. There are other geometries available as well, such as parallelograms. These alternate constructions are not Goldberg polyhedra.

Figure 9B:
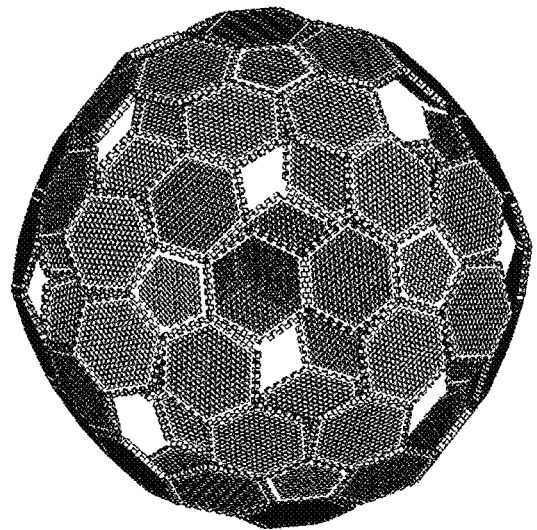
Figure 10:
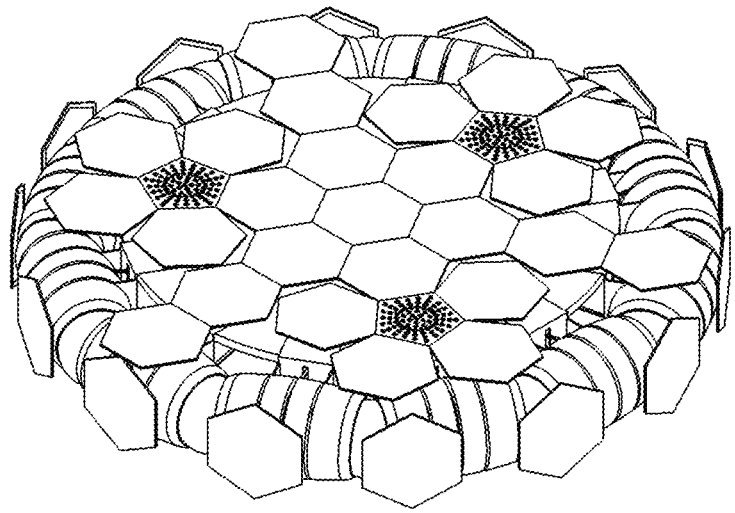
FIG. 10 illustrates a spring hinge, according to various embodiments of the invention. The illustration includes a spring hinge to allow bending and stretching between the polyhedral components as the segments move around the sides of the inner platform while in motion.
Figure 10:
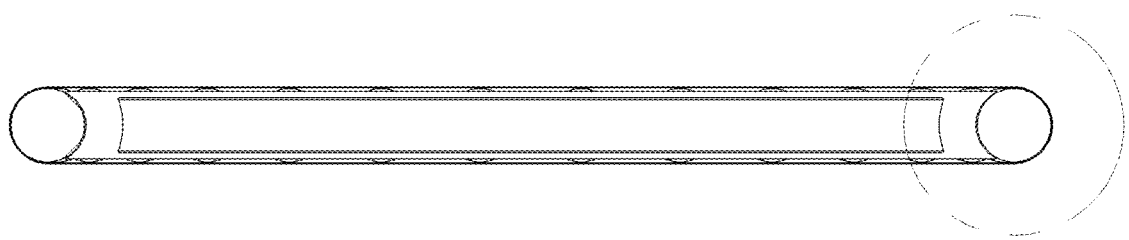

Referring to FIGS. 9B and 10, a further enhancement of the Goldberg segments is inclusion of a hole pattern. Inclusion of holes permits the structure to stretch with lower material stress for equal strain. These patterns are made from Hexagon and Pentagon Shapes like a soccer ball. Elastomers shapes stretch to fill the gaps. Spring hinge pins allow for bending on the hinge lines.

Figure 11B:
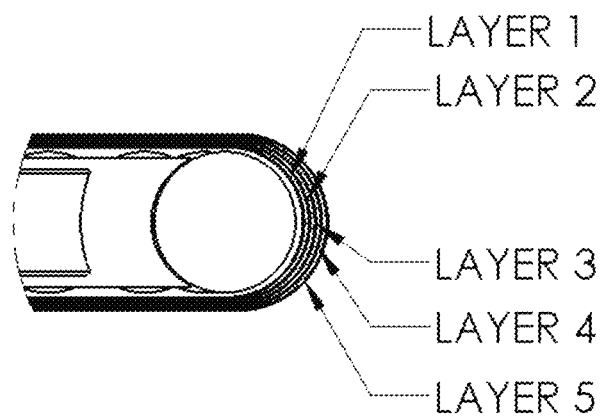

Multilayer Skin Tread: Referring to FIGS. 11A and 11B, the Multilayer Skin Tread use thin layers of different tread materials, coating and textures to have specific properties on the different layers. The inner layer needs to be extremely low friction such as Teflon (PTFE) coating, as it is sliding on the spindle surfaces. The outer layer preferentially needs to have a higher friction, or needs to have traction so the user's foot surface and the motor drives will be able to move the tread surface in any direction. The inner and outer surfaces of each layer may or may not be bonded together. Working with layers multiple thin layers will create a stronger tread, and will also aid in the overall assembly of the entire bobbin unit.

Figure 12:
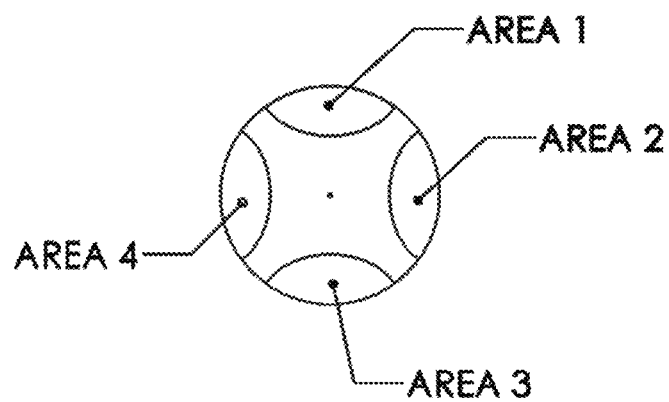
FIG. 12 illustrates a top view of a multi-layered tread surface, according to various embodiments of the invention. The illustration includes a multi-layered single-skinned tread, wherein the inner layers do not necessarily need to be bonded.

Referring to FIG. 12. In various embodiments, layers may or may not be bonded together, layers may or may not be of the same materials or material properties, and optionally inside layers do not have to be bonded or sealed (areas 1-4 below). Outside layers may be selected for friction with the feet or footwear of a user. Inside layers may be selected for reduced friction of motion of the tread surface against the supporting structures. Outside layers (e.g., layer 5) may, therefore, have a greater coefficient of friction than inside layer 1.

FRICTION REDUCTION SYSTEM: The surface between the Spindle and the Tread is a very high friction force area. To alleviate these frication forces, we have designed different alternative methods. Although the primary solution to high friction force is employment of a low friction layer such as Teflon™ (or PTFE), other solutions are available.

Figure 13:
FIG. 13 illustrates air flow within a tread, according to various embodiments of the invention. Air levitation of the revolving tread in order to reduce friction on the interior locomotion surface; similar to a bellows or an hair hockey table.

Air Bearing: Referring to FIG. 13, the Air bearing spindle uses a similar concept to an air hockey table. An air hockey table uses small air jets to levitate a puck on the surface. The air bearing spindle has a porous spindle surface or uses air jets to separate the tread material from the spindle surface. This will minimize or eliminate the friction. The arrows in the image below represent the airflow applying a force to the tread/bladder. This driving force causes the tread to expand like a balloon away from the spindle, thus lowering the friction between the two elements.

Magnetic Levitation: By utilizing the magnetically polarized tread material and a permanent or electromagnet, the tread material can be levitated above the spindle surface minimizing or eliminating the tread-to-spindle contact, thereby reducing or eliminating the friction forces.

Figure 14A:
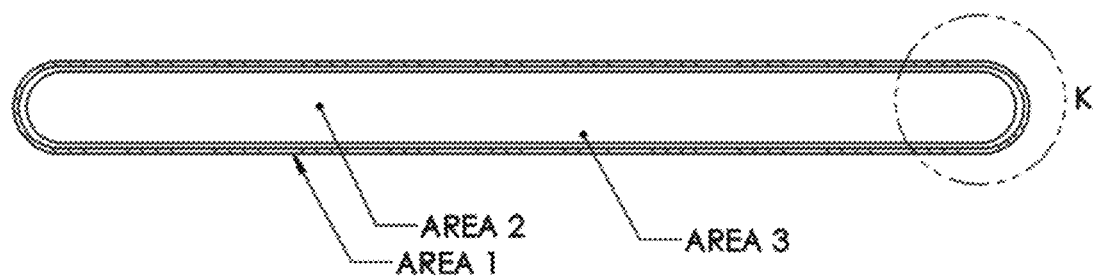
FIG. 14A illustrates magnetic levitation of a tread, according to various embodiments of the invention. Magnetic levitations systems description; 1) the tread material may have ferrous characteristics, and the inner locomotion surface may have permanent or electromagnetic magnetism of opposite polarity, thereby raising the elastomer tread from the inner surface to minimize friction; 2) the inner locomotion platform may exude magnetism, and there may be opposing magnetism exuding from the base of the device, thereby raising the entire Spindle system via magnetic levitation minimizing friction on the under-mounted rollers.
Figure 14B:
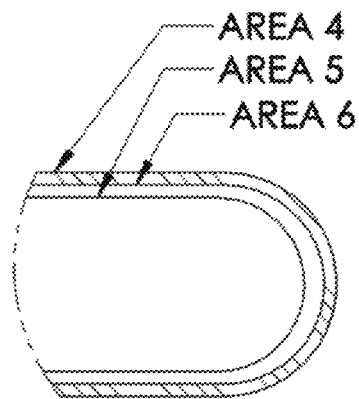
FIG. 14B illustrates a detailed view of the tread of FIG. 14A, according to various embodiments of the invention. The illustration includes cut-away close-up view of magnetic tread and repelling inner locomotion surface magnets.

Referring to FIGS. 14A and 14B. Area 1=Magnetically Polarized Tread; Area 2=Permanent or electromagnetic spindle; Area 3=Inductive power supplied to spindle for electromagnetic spindle; Area 4=Exterior surface of tread has an opposing magnetic charge to the inner surface. Area 5=Interior surface of the tread is polarized differently than the spindle to create a separation of the tread from the spindle. This is to eliminate (or minimize) the friction between the spindle and the t read. Area 6=The spindle magnet can be permanent or electromagnet. The electromagnet can be powered by an inductive power coil similar to wireless cell phone charging. Control of the electromagnet is done through wireless communication.

Dry & Wet Lubrications: Dry and wet lubricants are used to reduce the friction between the tread and the spindle. These lubricants are also used to dissipate some of the thermal energy created by the friction.

Figure 15:
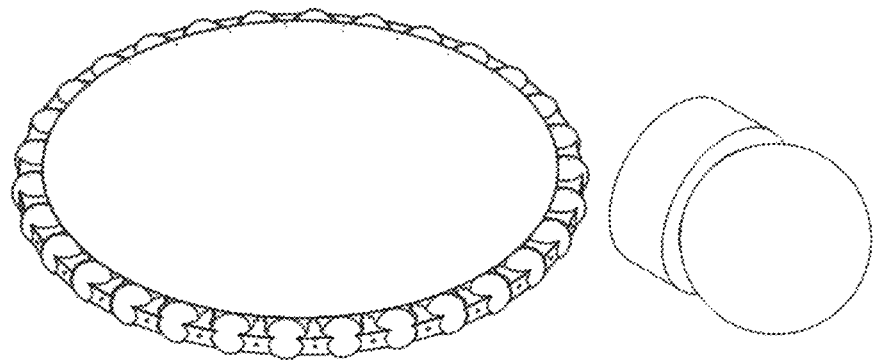
FIG. 15 illustrates an inner locomotion surface, according to various embodiments of the invention. Ball bearing encircled inner locomotion surface, which enables freedom of movement of the spheroid revolving tread.
Figure 16:
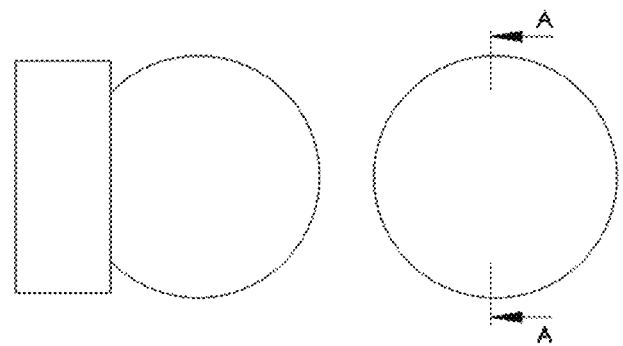
FIG. 16 illustrates a ball bearing rig, according to various embodiments of the invention.

Ball Transfer Bearing: Referring to FIGS. 15 and 16, this is the most straightforward means of friction reduction around the edges as it transmits motion onto the rolling contact of a bearing. Balls, rollers or rollers+balls around the outside accomplish this task. On the top surface, this may be accomplished by employing a bed of omni-rollers lined up to form a surface. Omni-rollers need to be sized small enough to form a surface with a large number of foot contact points, but large enough to employ bearings of reasonable size.

Figure 17:
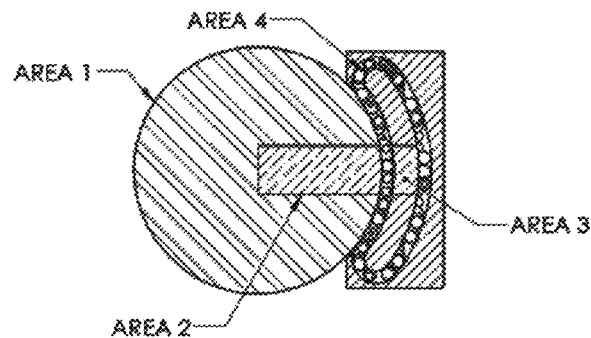
FIG. 17 illustrates an adapted ball bearing rig, according to various embodiments of the invention.

Referring to FIG. 17: Area 1=Edge ball bearing; Area 2=Magnet embedded inside the edge bearing; Area 3=Magnet embedded inside the ball transfer base unit; and Area 4=recirculating bearings.

Figure 18:
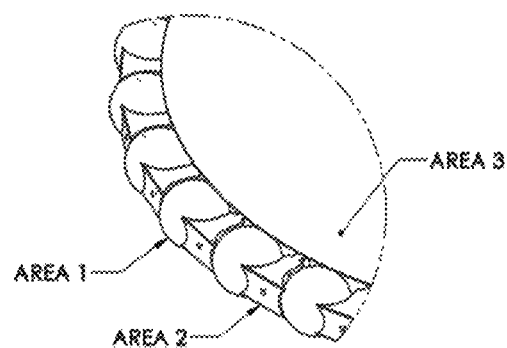
FIG. 18 illustrates a bearing retainer assembly according to various embodiments of the invention.

Referring to FIG. 18: Area 1=Edge ball bearing, which is similar to a ball transfer unit with smaller ball bearings behind the main ball in contact with bladder (t read). Area 2=Bearing retainer (may not be required) Area 3=Spindle.

Figure 19:
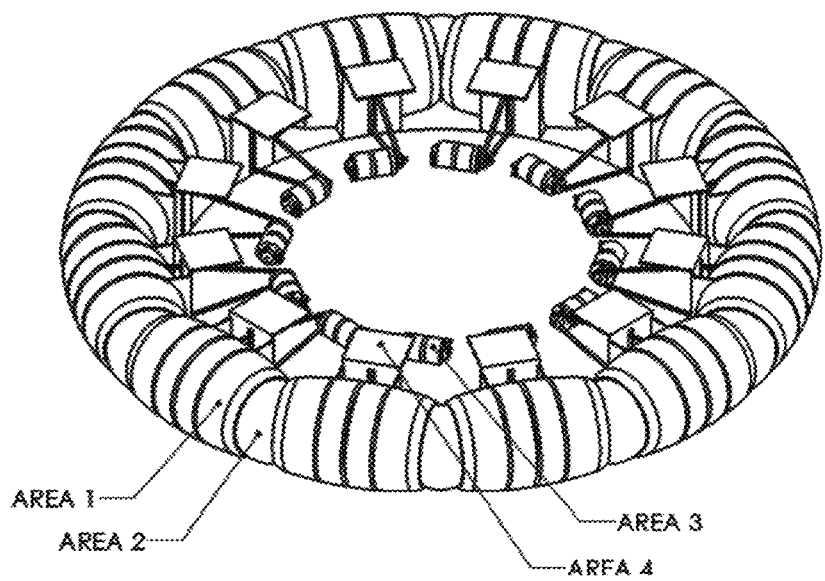
FIG. 19 illustrates a roller assembly including a plurality of motor drives, according to various embodiments of the invention.

Roller-ball-socket unit: Referring to FIG. 19, motion along the OmniPad periphery varies continuously. Motion vectors combine both vertical and horizontal motion. It is the most straightforward way to provide a rotational surface for vertical motion. Horizontal motion along the sides will need to rely on low sliding friction or bearing supported rollers.

Figure 20:
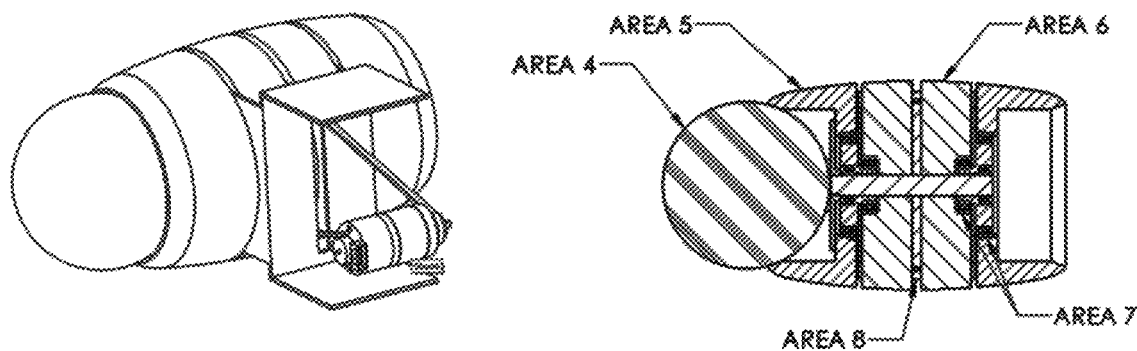
FIG. 20 illustrates details of an alternative roller assembly, according to various embodiments of the invention.
Figure 21:
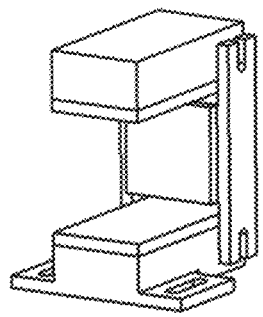
FIG. 21 illustrates a magnetically levitated spindle, according to various embodiments of the invention.
Figure 22:
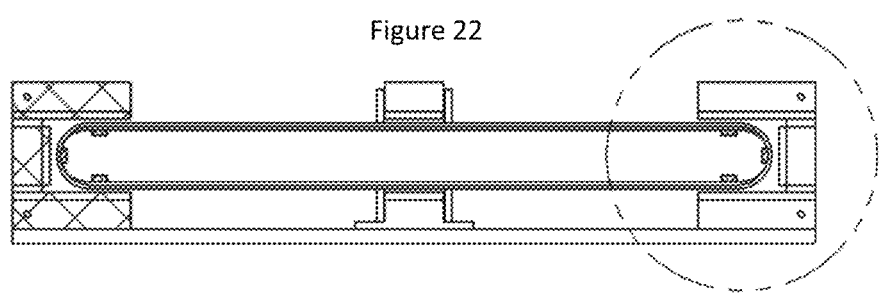
FIG. 22 illustrates a cross-sectional view of a magnetic levitation system, according to various embodiments of the invention. The illustration includes both the Spindle and the Spindle support system.

From the cross section of FIG. 20, we see the repeating bearing unit that rings the active surface. In this embodiment, we see a center roller with a ball. Closer inspection shows the roller mounted on a central ball bearing, which will transmit vertical bladder forces with high efficiency. The ball is mounted in a cup, and the cup also mounted on a bearing.

When these units are stacked together around the periphery of the OmniPad, each ball fits into the socket of the next. Further, we see that each ball is held by two sockets, with each socket having its own bearing. The ball will rotate relatively freely, with some friction against the bearing cups because of the mounting angle. Separate segments permit varying vertical motion vectors to maximize the bearing-supported motion, as opposed to friction-supported motion. This type of repeating unit is driven from the outside of the OmniPad.

Referring to FIG. 20. To preserve a secure ball mount and avoid interference of the roller segments, the above design employs straight versus curved roller segments. This design can be driven internally or externally as before. Advantages: fewer parts, more driving surface (for internal drive) and potentially less bladder stress due to larger roller diameter.

In FIG. 19: Area 1=Roller surface; Area 2=Ball bearing allowing for free movement between rollers Area 3=Optional motor drive system; and Area 4=Roller mounting bracket.

In FIG. 20, Area 4=Ball bearing; Area 5=Outer ball roller cup Area 6=Inner roller; Area 7=Bearings; and Area 8=Optional motor drive belt.

TREAD SUPPORT SYSTEM: Referring to FIG. 3. The bearing support system allows the bobbin assembly to move with little or no friction. This system supports the bobbin during operation and translates the loads to base system.

Magnetically Levitated Spindle: Currently, magnetic bearings are commonly used in industrial applications such as turbomolecular pumps, or even mag-lev trains. The magnetically levitated bearing supports leverage on the technology that is used in other products to create a non-contacting bearing system that uses permanent magnet and/or electromagnets to magnetically levitate the bobbin assembly without any physical contact. Referring to FIGS. 21, 22, 23A, and 23B, the magnetically levitated bearing supports eliminate any mechanical wear that the contact bearing create, and it eliminates friction. The OmniPad uses permanent magnets inside of the bobbin assembly, and electromagnets in the bearing block.

Figure 23A:
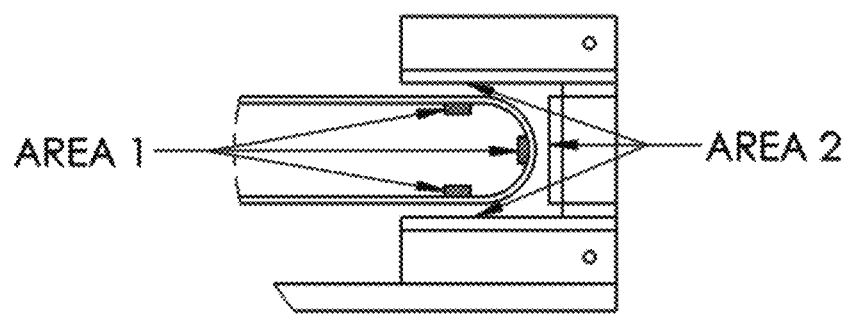
FIGS. 23A and 23B illustrates alternative magnetic levitation systems, according to various embodiments of the invention.
Figure 23B:
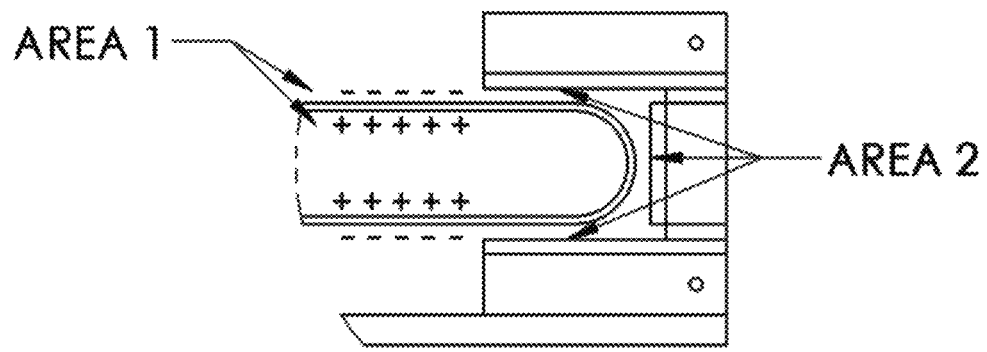

In FIG. 23A: Area 1=Permanent magnet embedded into the spindle Area 2=Permanent or electromagnet. In FIG. 23B: Area 1=Magnetically polarized tread Area 2=Mag-Lev bearing block.

Figure 24:
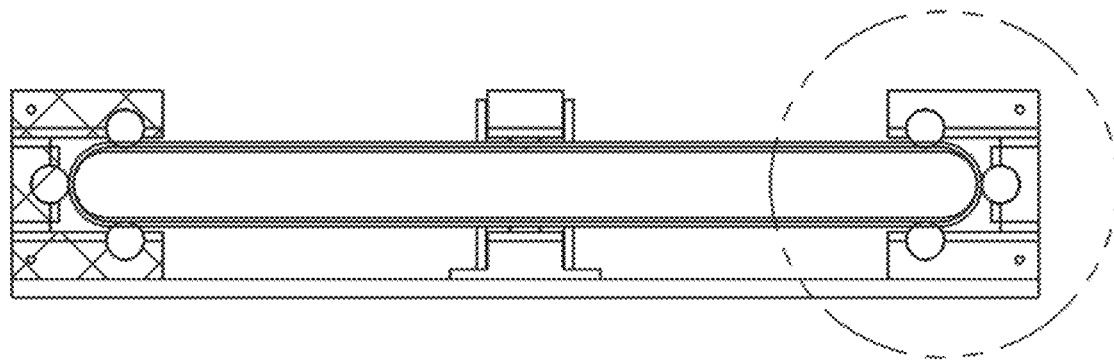
FIG. 24 illustrates a cross-sectional view of an alternative spindle support system, according to various embodiments of the invention.
Figure 25:
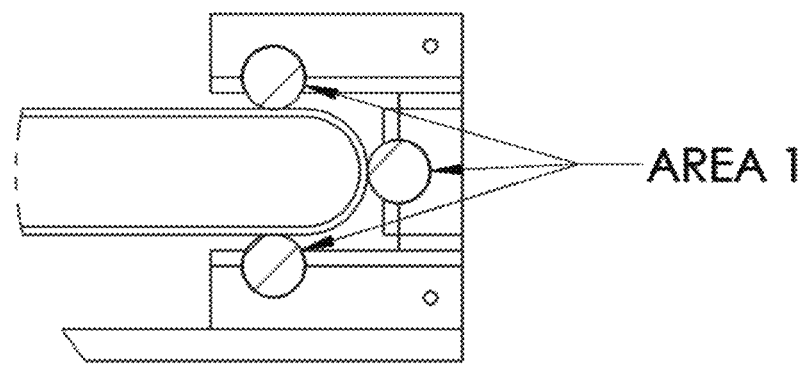
FIGS. 25 and 26 illustrate a detailed view of a section of FIG. 24-A, according to various embodiments of the invention.
Figure 26:
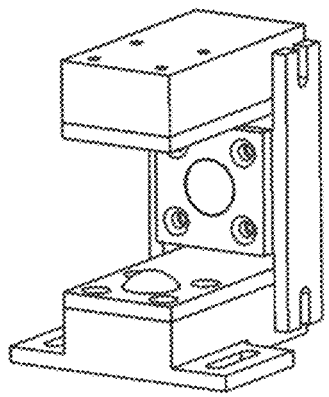

Ball Transfer BearingBlock: Referring to FIGS. 24, 25, and 26, the ball bearing supports the bobbin assembly with a thrust bearing to allow for low friction to transfer the loads. The below images show how the ball bearing block interfaces with the bobbin assembly in vertical and axial loads. A minimum of 3 bearing blocks are required, while the images below show 4 bearing blocks. In these figures: Area 1=Ball transfer units configured to support axial and radial loads. Motor drive can be integrated into the ball transfers.

Figure 27:
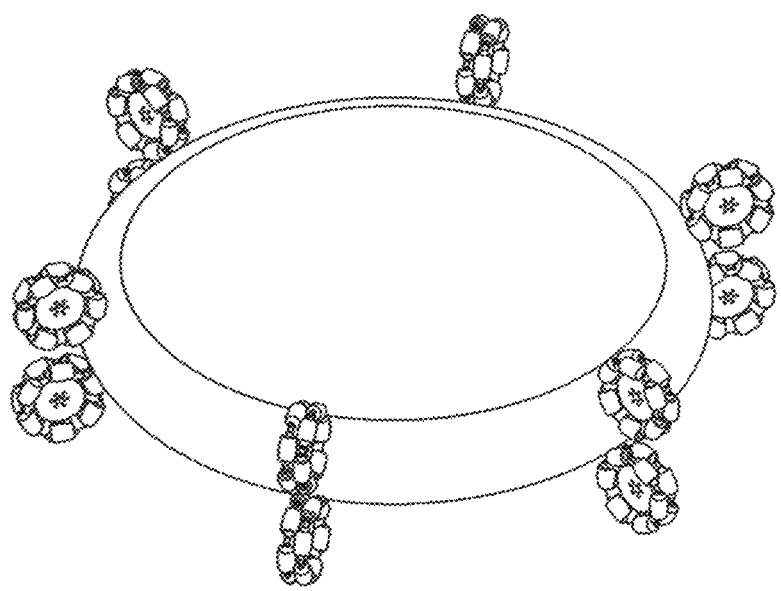
FIG. 27 illustrates an omni-wheel spindle support configuration, according to various embodiments of the invention. In various embodiment the Omni-wheel Spindle supports configuration; omni-wheel rigs affixed intermittently to the base of the device will support the Spindle unit while concurrently allowing the tread surface to revolve freely in any direction.

Omni Wheel: Referring to FIG. 27. Omni wheels of the standard (shown) or the Mecanum wheel type are used to support and stabilize the spindle assembly. No fewer than three points of contact are required for full stability, though six are depicted. Support nodes require wheel pairs: one for bottom and one for top. Either or both of these wheels may be powered to control surface movement.

As with other drive mechanisms, the surface velocity vector at the contact point of the roller is what determines roller drive velocity. Omni-wheels have the unique feature of driving only in the plane of the wheel, orthogonal to the drive axis. All other motion is passed through the rollers. Drive velocity at a given point is accomplished by revolving and driving only the motion vector that the roller can address.

Referring to FIG. 27, the system is supported at 45 degrees above and below the center line by 3 to 8 pairs of support wheels. These support wheels can be used in tandem to drive tread.

SPINDLE: The spindle provides the rigid surface for the user to operate on while providing a support structure for the edge bearings. The Spindle will be approximately 200 mm thick and approximately 1-2 meters diameter. The Top Surface is designed to support the user during operation.

The difficulties in assembling the bobbin assembly in real world manufacturing has lead us to investigate solutions for this problem. To understand this more, we are inserting a disc (the Spindle) into a Tread (or Bladder), while stretching the bladder to very high loads in order to eliminate any wrinkling or bunching, and to evenly distribute the forces throughout.

Solid or Segmented Spindle: Referring to FIG. 28, the segmented spindle takes a rigid solid spindle and breaks it into pieces that can be assembled inside the bladder. Once assembled, the spindle is then expanded (either manually or automatically) to the proper size and shape. In some embodiments, an otherwise solid spindle is broken into smaller pieces to assist in assembling the spindle into the bladder. Optional a ratcheting device to expand the spindle once assembled inside the bladder.

Alignment Features

Inflatable Spindle: The inflatable spindle (See FIG. 29 Area 1) allows for the spindle to be inserted into a small opening in the Bladder during the assembly process. The spindle is then filled with a media (Gas or liquid) to rigidize the spindle such that the loads (bearings and user's weight) are properly supported and managed. One of the major factors in this material is the low coefficient of friction.

DRIVE SYSTEM: Driving the Omni-Directional Treadmill can be accomplished via internal or external motors. The drive system is essential to overcome the high frictional forces that the tread experiences. These motors are typically controlled by circuits responsive to sensors that detect motion of a user standing on the treadmill. The circuits configured to keep the user centered on the treadmill as the user moves on various directions by walking or running, etc.

Figure 30:
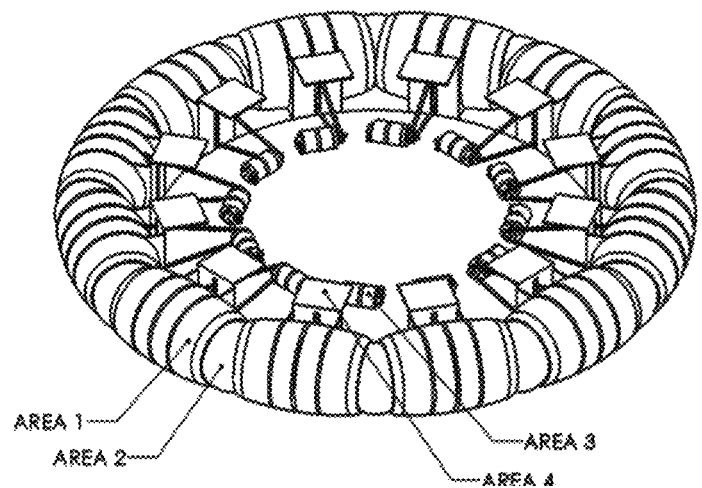
FIG. 30 illustrates an internal locomotion tread drive system, according to various embodiments of the invention. The internal locomotion tread drive system includes assistive or driving motors configured to be controlled wirelessly and powered by inductive charging.

Internal Drive: Referring to FIG. 30. This repeating unit places a drive sprocket central to the roller and runs the drive belt internally. We see a recurring theme of separate sections. As before, the balls are mounted in sockets that are themselves free to rotate. A further variation, not shown, would be to connect all four central roller segments into one, and to put the bearing under the ball cup as seen in the previous design. The variation would drive more of the edge surface but would have more vertical friction shear.

Figure 31:
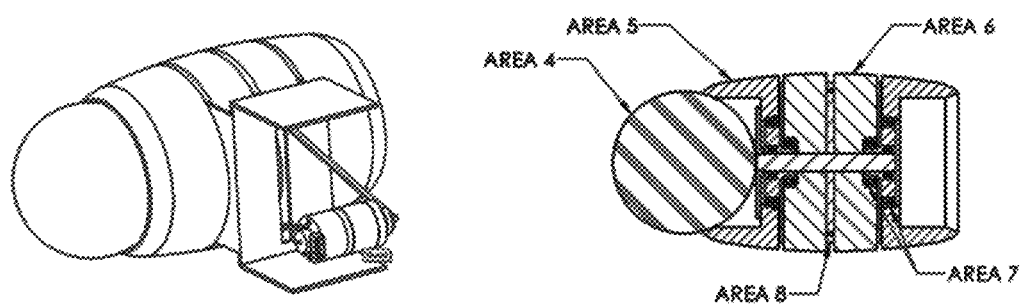
FIG. 31 illustrates cross-sectional view of a drive system, according to various embodiments of the invention.

Referring to FIG. 31: Area 1=Roller surface; Area 2=Ball bearing allowing for free movement between rollers; Area 3=Motor drive system and Area 4=Roller mounting bracket. Referring to FIG. 20B: Area 4=Ball bearing; Area 5=Outer ball roller cup Area 6=Inner roller; Area 7=Bearings; and Area 8=Motor drive belt.

Figure 32:
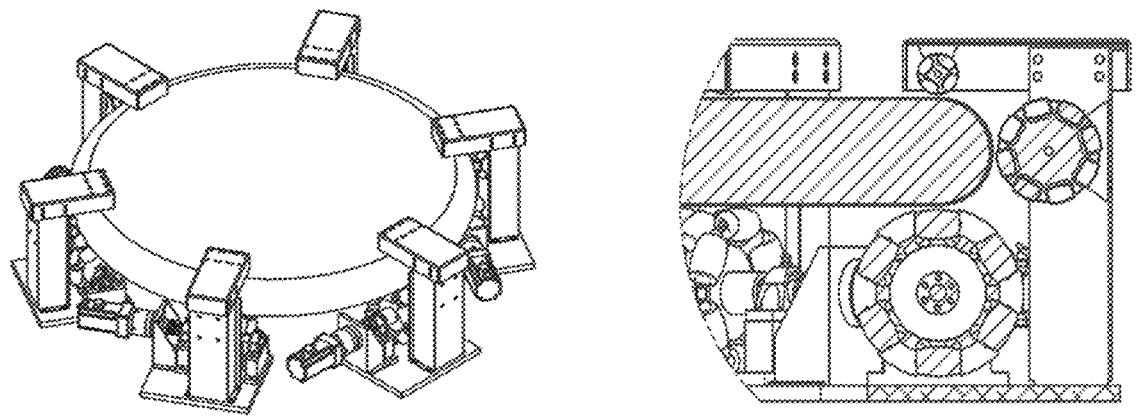
FIG. 32 illustrates an adaptation of omni-wheels, according to various embodiments of the invention. Adaptation of omni wheels, or Mecanum wheels, affixed intermittently around the stationary base of the device, similar to the bearing blocks, wherein these wheels simultaneously support and stabilize the revolving circular tread surface while still allowing the revolving tread to move in any direction.
Figure 33:
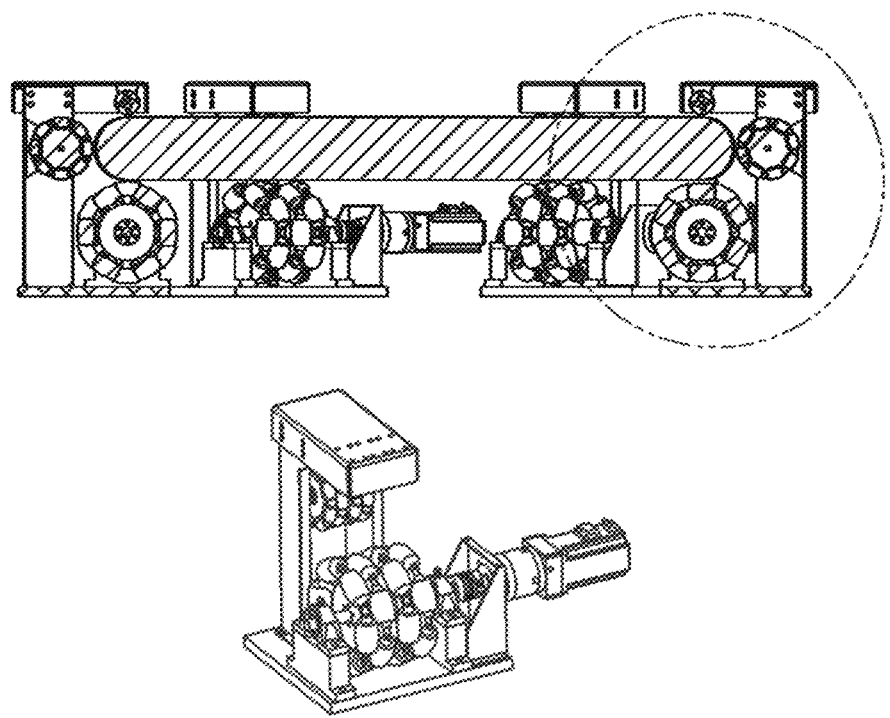
FIG. 33 illustrates cross-sectional view of the system of FIG. 32, according to various embodiments of the invention.

Omni Wheel: FIGS. 32 and 33 illustrate six external omni wheels driving a surface. Omni-rollers on the bottom are connected to servo motors. Each omni roller drives only the motion vector tangent to the contact point. Motion transverse to the contact point passes through because of the roller construction. Omni-rollers on top typically serve to constrain the OmniPad fully in 3D-space. Further, upper rollers can be used to increase the contact force of the drive rollers. In theory, only three drive rollers are needed to address all top surface motion vectors.

Figure 34:
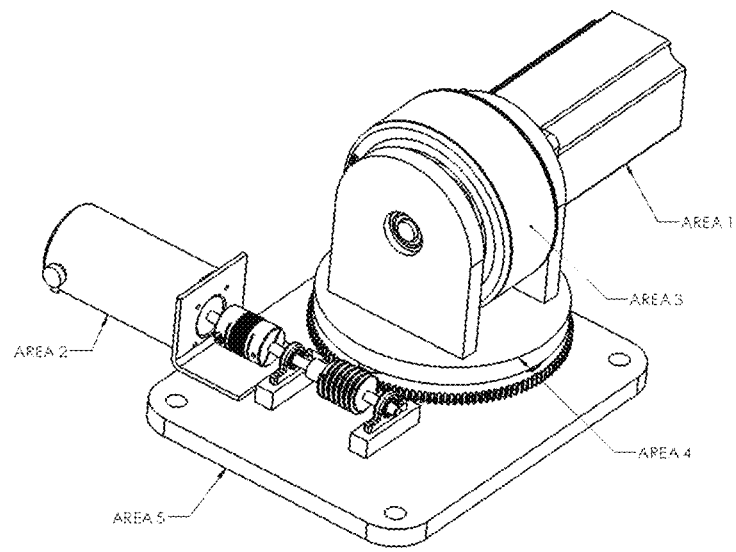
FIG. 34 illustrates an omni directional motor, according to various embodiments of the invention. Example of the omnidirectional motor that will be a part of a series of similar motors comprising the motor drive system. Omnidirectional motors will be affixed intermittently around the base of the device, driving and/or assisting the movement of the revolving tread surface; based upon real time data describing where the user is on the device and in the virtual environment.
Figure 35:
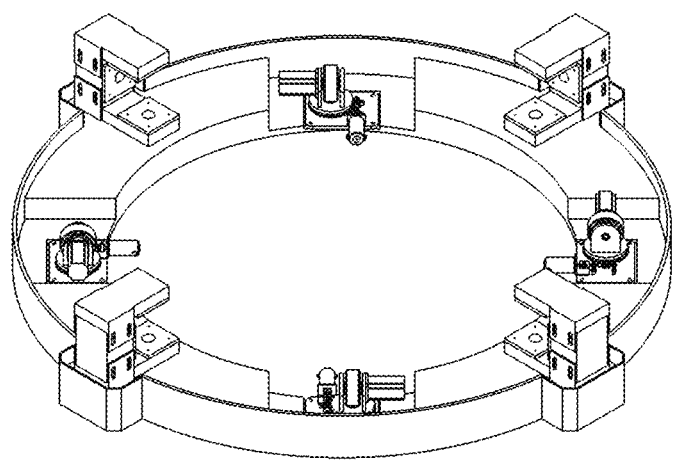
FIG. 35 illustrates use of an omni-directional motor in a drive system, according to various embodiments of the invention.
Figure 36:
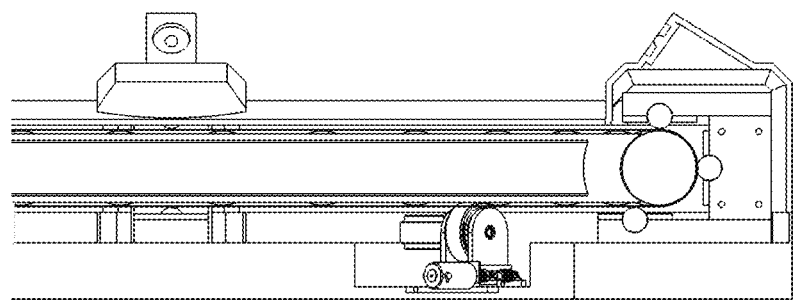
FIG. 36 illustrates a cross-sectional view of the system of FIG. 35, according to various embodiments of the invention.

Drive Wheel: Referring to FIG. 35 A simple drive system can drive the tread from a series of motors mounted under the bobbin assembly. See isometric view in FIG. 36. These motors are mounted on a rotary table to allow for motion in any direction. The images below show a motor system with 4 motors that are synchronized to move the tread while minimizing the adverse effects on the top user surface. In FIG. 34, Drive system with a simple motor and wheel on a rotating table: Area 1=Motor and encoder for main drive wheel; Area 2=Motor and encoder for table rotation; Area 3=Main Drive wheel, used to move the tread around the spindle Area 4=Rotating Table; and Area 5=Motor Base.

Figure 37:
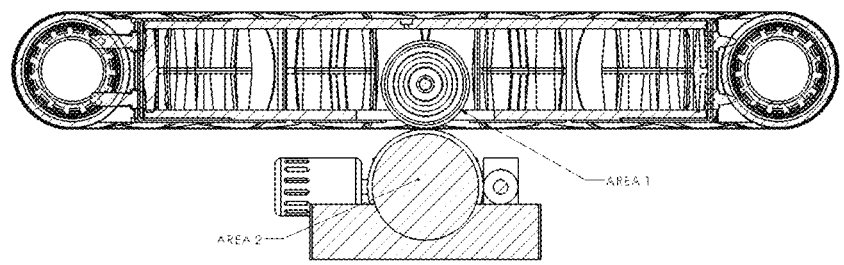
FIG. 37 illustrates a motor drive option, according to various embodiments of the invention. Option for a motor drive system where two motors drive a ball, which in turn contacts the revolving tread surface in order to assist and/or drive the revolution of the tread. This option may be used in conjunction with the motor drive option illustrated in FIG. 4.
Figure 38:
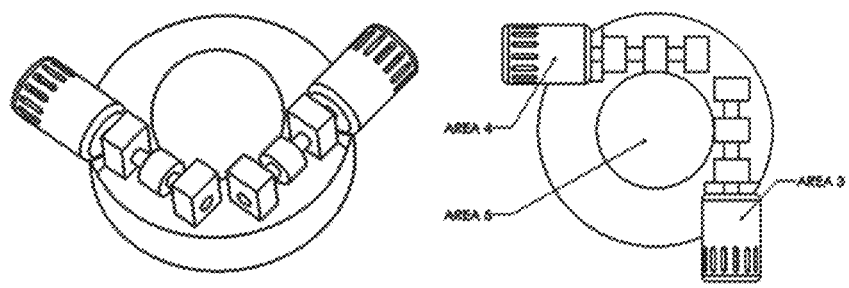
FIG. 38 illustrates a ball transfer motor configuration, according to various embodiments of the invention.

Ball Transfer Drive System: Referring to FIGS. 37 and 38, the Ball Transfer Drive System uses 2 motors to drive a ball supported by bearings underneath. This allows the motors to drive the ball in any direction. This motor drive system can be placed into the Ball Transfer Bearing Blocks, or as a stand-alone motor system in the center of the bobbin assembly.

Figure 39:
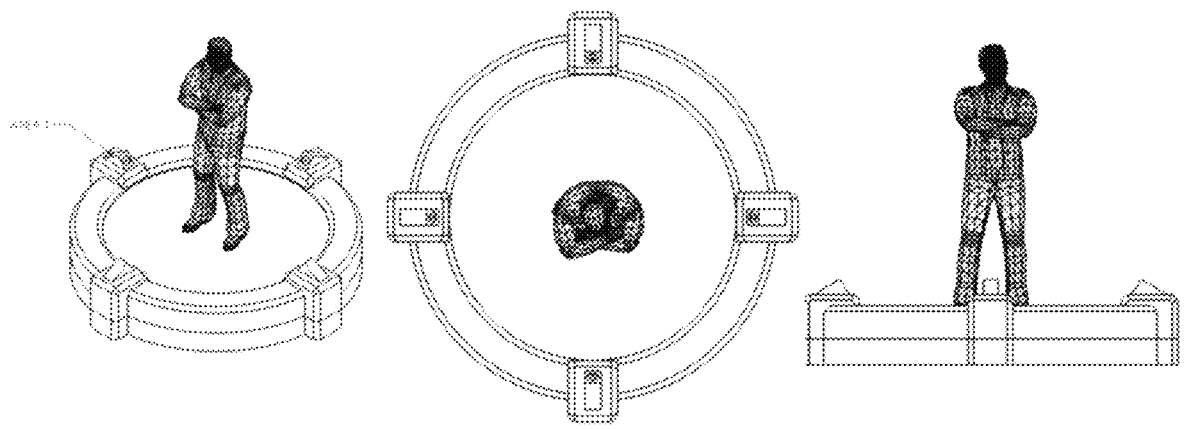
FIG. 39 Illustrates views of an omnidirectional treadmill, according to various embodiments of the invention. Illustration of an option for the motion tracking system placement and configuration, which will relay the locomotion data of the user in real time both to the VR environment and to the motor drive system (and to the (8.2, 8.3) Tilting and Varying Surface Robotic Platform). This combination of systems will implement predictive artificial intelligence, where the device will attempt to predict, based upon biokinetic analysis, the user's locomotion, and the motor drive system will respond by keeping the user centered on the circular locomotion surface. Other uses of the predictive analysis and motion tracking include enhanced interfacing of user into the virtual environment.

CONTROL SYSTEM: Referring to FIG. 39, the control system design controls the speed and direction of the tread surface. It ensures that the user has a safe and entertaining experience while using the omnidirectional moving surface. The control system utilizes user motion feedback, through cameras, force feedback through the safety harness and feedback from the drive motor system. These different feedback systems provide validation and confirmation of the user and operation of the OmniPad system.

Motion Feedback: Referring to FIG. 39, using Cameras pointed at the user or other sensors, the OmniPad control system can determine the position, direction and speed of the user. As the user changes any or all of the above locomotion characteristics, the motion feedback system responds to and can predictively adjust the OmniPad tread surface accordingly. The Motion feedback system can also identify where the users body parts are located providing additional feedback into the virtual environment. By recognizing the users' body position and velocity, the motion feedback system calculates where the user next step will be placed and the center of mass. This functionality will assist in the overall effectiveness of the immersive experience.

Motor Feedback: By monitoring the motors' direction (forward or reverse), velocity (via motor encoder or steps) and angle of attack (rotational direction relative to ground) we can control the actual position and motion of the tread. By monitoring the motor current and encoder position the system can monitor any system faults on the tread (i.e., the tread not moving, when we expect it to be moving).

User Force Feedback: Sensors on the user harness, footwear, and/or on the treadmill provide accelerations, directional and angular forces that the user generates while operating the OmniPad. These accelerations and forces are processed and converted into responses by the OmniPad tread to change direction or increase or decrease the speed while the tread is moving.

Pivot Table System

Walking or running on flat ground is adequate, but there are also inclines and declines in the real world that can be replicated by the OmniPad system. Being able to simulate walking up, down or across hills; or even to have the ability to simulate moving across different types of surfaces like gravel, sand, or mud will greatly enhance the virtual experience.

Figure 40:
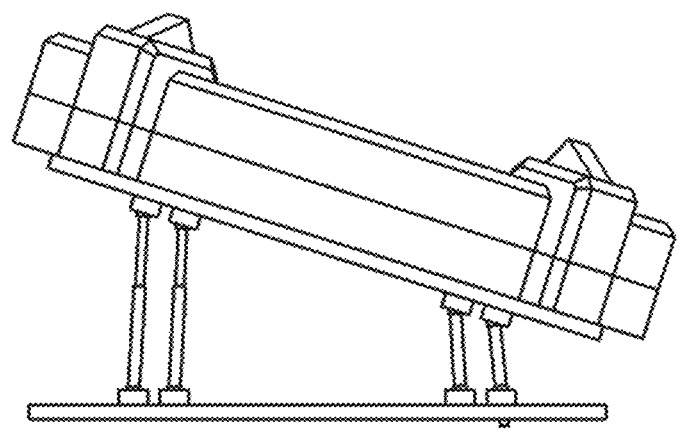
FIGS. 40 and 41 illustrate various views of a tilting omnidirectional treadmill, according to various embodiments of the invention. These views include a side view of the undermounted Tilting Robotic Platform option, which will respond in real time to the user's location in the virtual environment, wherein when the user encounters an incline in the VR environment the platform, and in turn, the locomotion surface, will tilt upwards in whatever direction the user is moving in order to emulate walking or running up a hill. The reciprocal is also true for emulating declines in the VR environment. Side view of the Varying Surface Platform option, which may work in conjunction with the Titling mechanism described in FIG. 8.2. This option will emulate elevation, and raising and descending in the virtual environment.

Tilting Robotic Platform: Referring to FIG. 40, by using a combination of linear actuators and sensors (load cells, position indicators) the locomotion surface can be actuated in order to change the tilt or pitch of the tread surface. By implementing the Tilting Robotic, or Stewart Platform the OmniPad can simulate to the user moving up, down or across slopes in the virtual environment.

Figure 41:
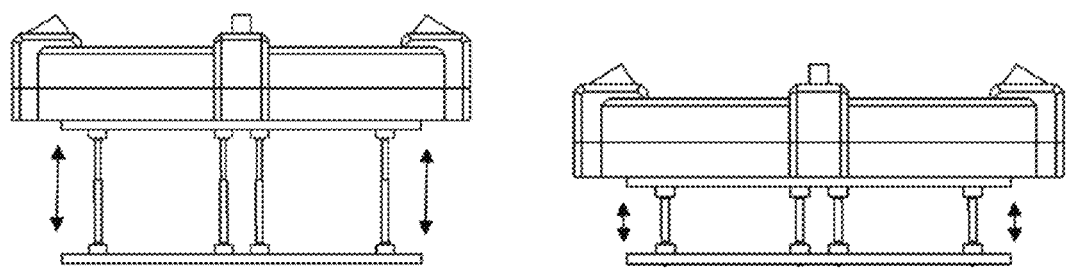

Varying Surface Emulation: Referring to FIG. 41, when the user is immersed in the virtual world, with visual, audio and locomotion, the OmniPad Control System can make small adjustments to the angle and elevation of the tread surface to simulate a wide variety of surfaces, such as gravel, sand or mud.

The OmniPad control system along with the immersive VR environment manipulates the users' sensory perception to give the feel of walking or running on different surface types and densities. The combination of the linear position indicators, and the load cells allows the control system to calculate the position of each of the user's feet. Thus, defining the accurate and subtle changes required to simulate the varying surface types.

The invention claimed is:

1. An omnidirectional moving surface system comprising:
 a first plurality of ball bearings;
 a spindle configured for positioning the ball bearings such that the ball bearings form a ring around the spindle;
 a bladder for enveloping the plurality of ball bearings; and
 a plurality of omni-wheels affixed intermittently around the bladder and configured to support the bladder.

2. The system of claim 1, wherein the spindle has a top portion to support the weight of a user.

3. The system of claim 1, further comprising: a base including a second plurality of ball bearings for holding the bladder.

4. The system of claim 1, further comprising: a track ball contacting the bladder and serving as the interface between the bladder and the virtual reality means.

5. The system of claim 1, wherein the bladder is an elastic spheroid.

6. The system of claim 1, wherein the bladder is comprised of a moneprene material.

7. The system of claim 1, wherein the bladder is comprised of gum rubber.

8. The system of claim 1 including a robotic configured to change height and tilt of the moving surface in response to a user's location in a virtual environment.

9. The system of claim 1, further comprising a motor configured to control movement of the bladder around the spindle.

10. The system of claim 1, wherein the omni-wheels are driven by at least 4 motors.

11. The system of claim 1, further comprising a motion feedback system configured to calculate where a next step of a user will be placed.

12. The system of claim 1, further comprising an air bearing configured to support the bladder.

13. The system of claim 1, further comprising a magnet configured to support the bladder.

14. The system of claim 1, further comprising a drive system including at least two motors configured to drive the bladder in any direction, the two motors being disposed beneath the bladder.

15. The system of claim 1, further comprising three additional omni-wheels affixed intermittently around or above the bladder.

16. The system of claim 1, wherein a tread surface of the bladder includes a multi-layer surface, the multi-layer surface including a plurality of pentagons and hexagons.

17. The system of claim 1, wherein a tread surface of the bladder includes a multi-layer surface, the multi-layer surface including a polyhedral assembly.

18. The system of claim 1, wherein the bladder includes a ferrous material.

19. The system of claim 1, wherein the bladder includes a tread surface configured to be stiffened or loosened in real time.

20. The system of claim 1, wherein the bladder is configured to become more flexible or more stiff in response to a voltage, current or field.

* * * * *